Figure 1:
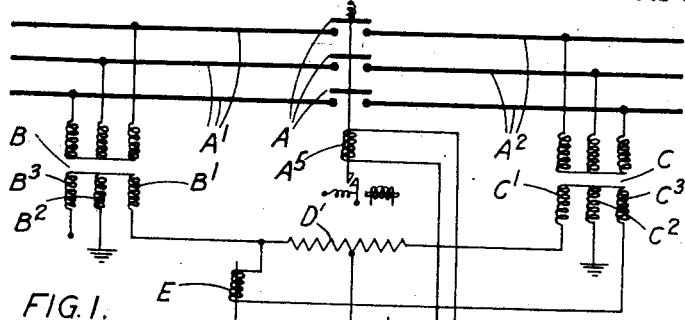

June 2, 1931.　　　T. R. WARREN ET AL　　　1,808,124
ELECTRIC SYNCHRONIZING APPARATUS
Filed April 21, 1928　　　3 Sheets-Sheet 1

INVENTORS
T. R. Warren
and N. Cooke
By Watson, Coit, Morse & Grindle ATTys

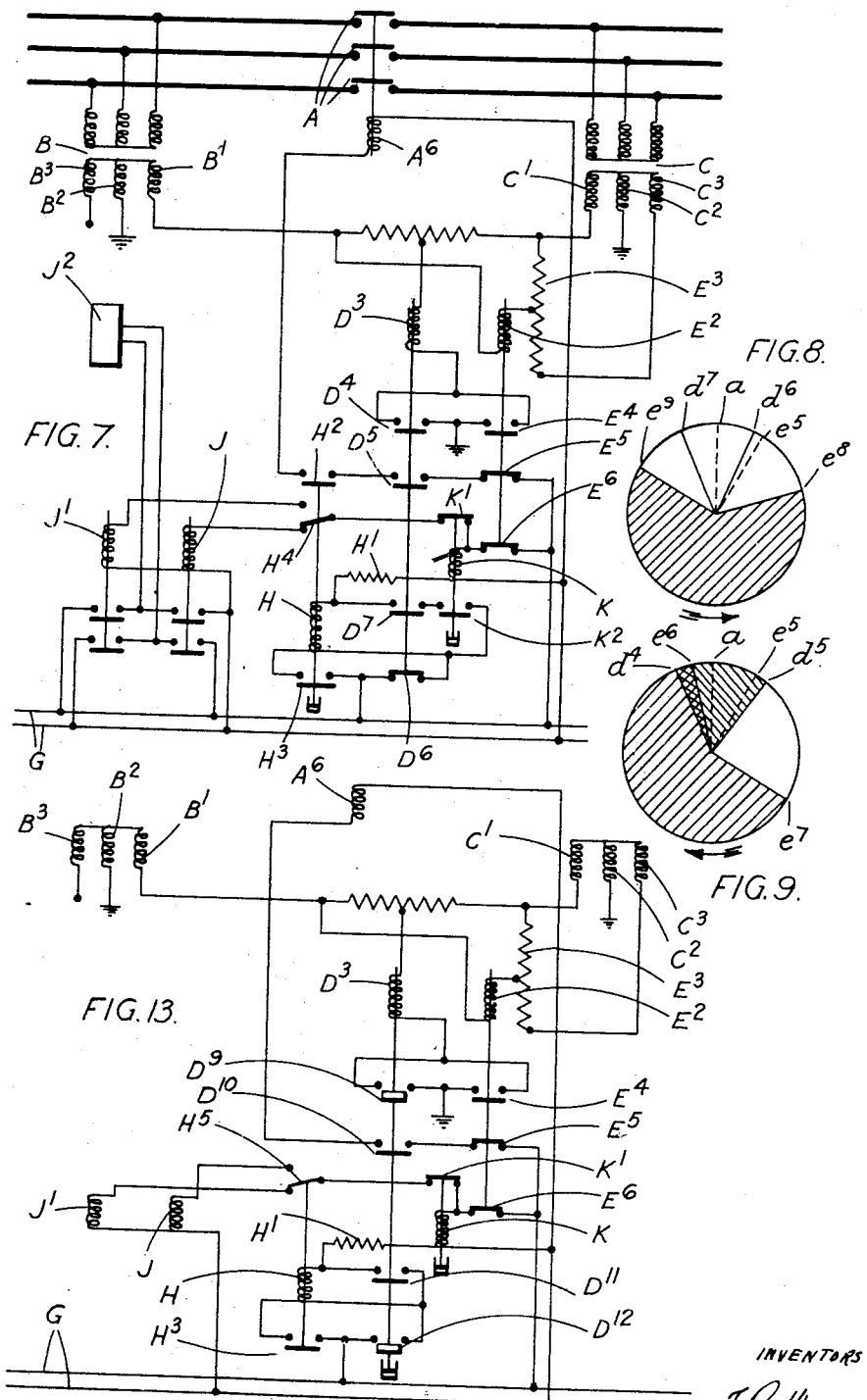

Patented June 2, 1931

1,808,124

UNITED STATES PATENT OFFICE

THOMAS REGINALD WARREN, OF JESMOND, NEWCASTLE-UPON-TYNE, AND NORMAN COOKE, OF SUNDERLAND, ENGLAND, ASSIGNORS TO A. REYROLLE & COMPANY LIMITED, OF HEBBURN-ON-TYNE, ENGLAND, A COMPANY OF GREAT BRITAIN

ELECTRIC SYNCHRONIZING APPARATUS

Application filed April 21, 1928, Serial No. 271,825, and in Great Britain May 3, 1927.

This invention relates to electric synchronizing apparatus for an A. C. synchronous dynamo-electric machine, and is more especially concerned with the control of an incoming machine which is to be brought into circuit with a running machine or machines. In such an arrangement, before the circuit-breaker is closed to allow the incoming machine to take power from or supply power to the system, it is necessary to adjust (a) the voltage of the incoming machine so that it will be equal to that of the system, (b) the speed of the machine to correspond closely with the frequency of the system, and (c) the voltage of the incoming machine to be in phase with that of the system. The present invention deals primarily with the second and third of these processes.

Hitherto it has been usual, after making the necessary adjustments to ensure the desired equality of voltages, to perform the final operation of closing the circuit-breaker by hand, the operator being guided in the selection of the appropriate moment to perform this operation by watching an indicating instrument, such as a rotary synchroscope. Serious damage may however result from switching-in the machine at the wrong time, more especially when there is a large phase difference between the two voltages, and it is consequently common practice to provide automatic interlocking mechanism, whose function is to prevent closing of the circuit-breaker unless the necessary conditions are approximately satisfied. In some cases also the whole operation of synchronizing has been performed automatically, but this has generally necessitated the provision either of complicated and costly apparatus or of simpler apparatus whose operation is somewhat unreliable.

The present invention has for one of its objects to provide a simple and reliable synchronizing apparatus for controlling the connection of an incoming synchronous machine in circuit with a running machine or machines, such apparatus either being wholly automatic in its operation or being employed as an interlock to prevent incorrect manual operation.

Another object of the invention is to provide a simple and efficient arrangement for controlling the speed of a synchronous machine relative to the speed or frequency of other apparatus (such for instance as a running machine or machines with which the incoming machine is to be brought into circuit), whereby the speed of the machine can be rapidly and automatically adjusted to the desired value.

A further object of the invention is to combine together as far as possible the apparatus used for speed control and that employed for controlling the closing of a circuit-breaker between the incoming and running machines, whereby a complete automatic synchronizing system can be obtained with a minimum of apparatus.

Still further objects of the invention will be clear from the appended claims and from the following description of the accompanying drawings, which show by way of example some convenient alternative arrangements according to the invention.

Figures 2, 3:
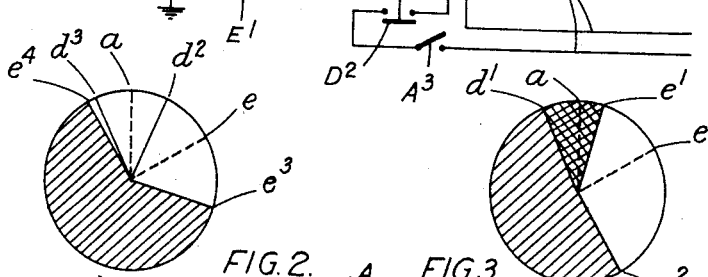
Figure 4:
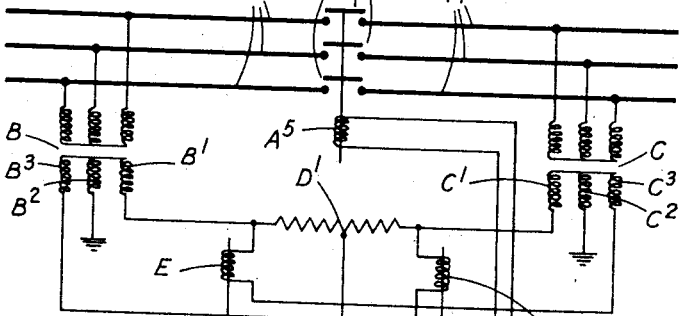
Figures 5, 6:
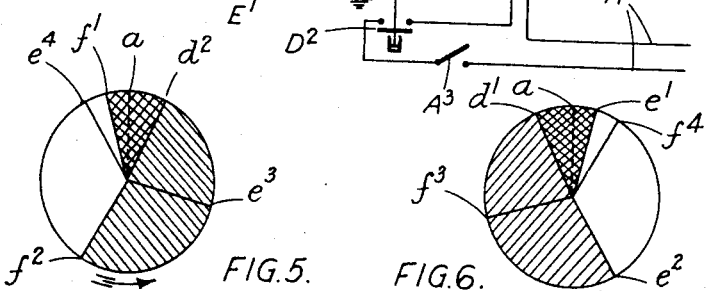
Figure 10:
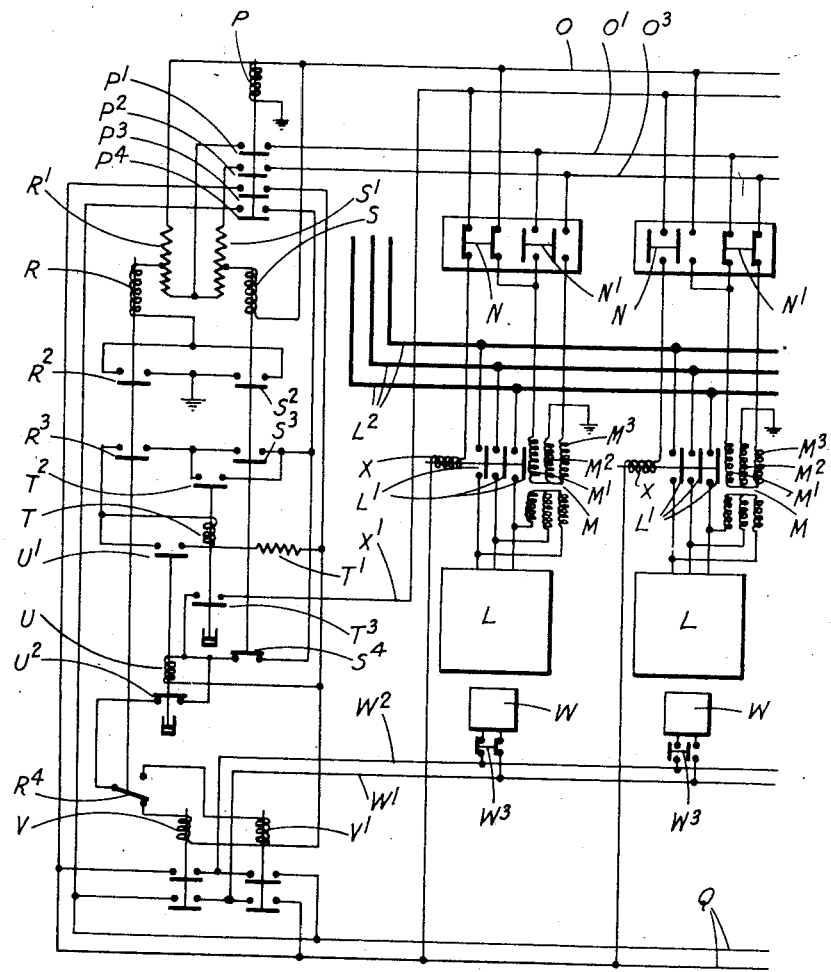
Figure 11:
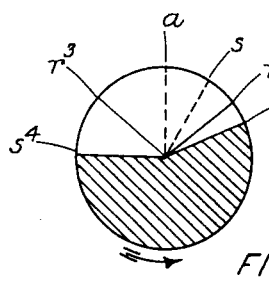
Figure 12:
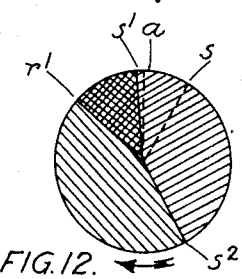

In these drawings,

Figure 1 is a diagram of circuits illustrating one arrangement primarily intended as an automatic interlock in a manually-operated synchronizing system, Figures 2 and 3 are synchroscope diagrams associated with Figure 1, Figure 4 is a circuit diagram of an alternative arrangement for an automatic interlock in a manual system, Figures 5 and 6 are synchroscope diagrams associated with Figure 4, Figure 7 shows one arrangement for a fully automatic synchronizing system including speed-controlling apparatus, Figures 8 and 9 are synchroscope diagrams associated with Figure 7, Figure 10 illustrates a preferred arrangement for a fully automatic system, Figures 11 and 12 are synchroscope diagrams associated with Figure 10, and Figure 13 shows a modification of the arrangement of Figure 7.

The arrangement of Figure 1 is primarily intended for use as an automatic interlock in a manually-operated synchronizing system for controlling the closing of a circuit-breaker A between mains $A^1$ and $A^2$ respectively connected to an incoming machine and to a running machine. The incoming machine is provided with a potential transformer B whose secondary phase-windings $B^1$ $B^2$ $B^3$ are connected in star on one side. The running machine is likewise provided with a potential transformer C whose secondary phase-windings $C^1$ $C^2$ $C^3$ are connected in star on one side. The free ends of the secondary phase-windings $B^2$ and $C^2$ are earthed, whilst the leading phases $B^1$ and $C^1$ are connected together through a resistance $D^1$ having a mid-point tapping, which is connected to earth through the operating coil of a synchronizing relay D and the normally open contacts $E^1$ of an auxiliary synchronizing relay E. The operating coil of the auxiliary synchronizing relay E is connected directly between the leading phase $B^1$ of the transformer secondary associated with the incoming machine and the lagging phase $C^3$ of the running machine transformer secondary. Thus, if the auxiliary synchronizing relay contacts $E^1$ are closed, the synchronizing relay D will receive its maximum operating current when the incoming and running machine voltages are in phase with one another, and will consequently lift its contacts $D^2$ shortly before the synchronizing position is reached and open them again shortly after this position has been passed. These contacts $D^2$, either alone (in the case of an automatic system) or in conjunction with a hand-operated switch $A^3$, control the circuit $A^4$ (directly or through a further relay) to the closing coil $A^5$ of the circuit-breaker A.

The operation of this arrangement can best be described in terms of the movement of the needle of a rotary synchroscope. In the case illustrated, when the two relays are used to control a manually-operated circuit-breaker, such a synchroscope would actually be provided, but, although in the case of a fully automatic arrangement a synchroscope would be unnecessary, it will be assumed for convenience of description that it is provided and is connected up in the usual manner. Figures 2 and 3 are diagrams illustrating the cycle of operations during rotation of the synchroscope needle respectively in the slow and in the fast direction, the arrows indicating the direction of rotation.

It will be seen that the connections to the operating coil of the auxiliary synchronizing relay E are such that the E. M. F. across this coil becomes zero at $e$ 60° after the synchroscope needle has passed the synchronizing position $a$ assuming a "fast" direction of rotation of the needle or 60° before the synchronizing position in the case of a "slow" rotation. This relay E is set to lift its contacts $E^1$, say, 90° after its own zero position, but owing to residual magnetism and the difference between the voltages necessary for holding and for lifting purposes, the contacts will fall at, say, 45° before this zero position. Thus for a fast direction of rotation the auxiliary synchronizing relay contacts $E^1$ will fall at $e^1$ 15° after the synchronizing position $a$ and will lift again at $e^2$ 150° after the synchronizing position, whilst for a slow direction of rotation the fall and lift positions will respectively be at $e^3$ 105° before and at $e^4$ 30° after the synchronizing position $a$, the period of lifting of the contacts being indicated by section lines.

The synchronizing relay D is set to lift its contacts at, say, 25° before the synchronizing position $a$. Thus if the synchroscope needle is rotating in the fast direction (Figure 3), the auxiliary synchronizing relay E will lift its contacts at $e^2$ 150° after the synchronizing position thus allowing current to flow through the operating coil of the synchronizing relay D. At $d^1$ 25° before the synchronizing position $a$ this current will be sufficient to lift the synchronizing relay contacts $D^2$ and these contacts will remain closed until $e^1$ 15° after the synchronizing position, when the fall of the auxiliary synchronizing relay contacts $E^1$ will deenergize the synchronizing relay D. During this period (indicated by crossed section lines) the circuit $A^4$ is completed to allow the circuit-breaker A to be closed, this period being long enough to give adequate time for the manual operation of the circuit-breaker by the hand-switch $A^3$ but yet short enough to avoid risk of damage to the plant from mis-timed operation. If on the other hand the needle is rotating in the slow direction (Figure 2), the auxiliary synchronizing relay contacts $E^1$ will fall at $e^3$ 105° before the synchronizing position $a$ and will remain open until $e^4$ 30° after that position. During this period no current will flow to the operating coil of the synchronizing relay D, and since the synchronizing relay can only lift its contacts between $d^2$ and $d^3$ 25° on either side of the synchronizing position $a$, this relay remains completely inoperative, so that it is impossible to close the circuit-breaker A at all if the speed of the incoming machine is slow.

If desired, the synchronizing relay D may be provided with a dashpot or other time-delay mechanism, for the purpose of preventing closing of the circuit-breaker A when the speed of the incoming machine is considerably greater than that of the running machine. Generally, however, such a time-delay mechanism will be unnecessary with the arrangement according to the invention, as will be shown in the next paragraph, since in the majority of cases the apparatus will be called upon to operate only when it is desired to bring a previously inactive machine into circuit. If, however, when no special time-delay mechanism is provided on the synchronizing relay, it becomes necessary to switch in a machine already rotating at a speed greater than that of the running machines, the speed of the machine must first be reduced below synchronous speed before the two relays are allowed to operate or alternatively some other apparatus (such for example as part of the automatic speed controlling apparatus if such is provided) must act to prevent closing of the circuit-breaker at the higher speeds.

Thus when it is desired to bring a previously inactive machine into circuit, the machine is started up and the necessary adjustments are made to ensure that its voltage at synchronous speed will be sufficiently nearly equal to that of the running machines. The speed of the incoming machine is then gradually increased, the synchroscope needle rotating at first rapidly and afterwards more and more slowly. Since however the needle is rotating in the slow direction (Figure 2), the synchronizing relay D will remain inoperative. The speed of the machine continues to increase until the synchronous speed is passed, and the synchroscope needle meanwhile gradually comes to rest and starts rotating in the opposite direction, namely in the fast direction (Figure 3). As soon as the needle reaches the position $d^1$ 25° short of the synchronizing position $a$ during its first rotation in the fast direction, the synchronizing relay D will operate its contacts and thus allow the circuit-breaker A to be closed by operating the switch $A^3$. It will thus be seen that with the arrangement according to the invention the circuit-breaker A will close at the most favorable moment as regards speed conditions, without the necessity of providing the synchronizing relay with a special time-delay mechanism.

In the foregoing description of the arrangement of Figure 1, synchronizing is allowed from the fast side but is prevented from the slow side. This has been chosen in preference to the converse arrangement, since the apparatus will most commonly be used for the purpose of bringing a further machine into circuit to assist already overloaded running machine, and the conditions in such a case will be improved on switching-in a slightly fast machine since it will give out energy owing to the retarding effect it experiences when its speed gradually falls to synchronous speed.

In the case when the apparatus is used as an automatic interlock in a manual synchronizing system, the arrangement above described may be modified to allow synchronizing from either the fast or the slow side. For apart from its main function of discriminating between fast and slow synchronizing, the arrangement has the further advantage of enabling a satisfactory synchronizing angle to be obtained, and it may be desired to utilize this latter advantage without the limitation imposed by the speed discrimination. To this end this arrangement may be modified as shown in Figure 4 by the provision of two auxiliary synchronizing relays E F instead of one, these two relays having their contacts $E^1 F^1$ in parallel with one another controlling the synchronizing relay D. One auxiliary synchronizing relay E is connected as in Figure 1 between the lagging phase $C^3$ of the running machine transformer secondary and the leading phase $B^1$ of the incoming machine secondary, whilst the other relay F is connected between the leading phase $C^1$ of the running machine secondary and the lagging phase $B^3$ of the incoming machine secondary. In all other respects the arrangement is identical with that of Figure 1 and the same reference letters are employed.

Figures 5 and 6 are synchroscope diagrams similar to Figures 3 and 4 for this arrangement. For the fast direction (Figure 6) the cycle of operations for each rotation of the synchroscope needle takes place as follows. At $e^2$ 150° after the synchronizing position $a$ the relay E lifts its contacts $E^1$, these contacts remaining closed until $e^1$ 15° after the synchronizing position, as indicated by the section lines. The relay F lifts its contacts $F^1$ at $f^4$ 30° after the synchronizing position $a$ and lets them fall at $f^3$ 105° before the synchronizing position, and consequently has no effect on the synchronizing relay D since the contacts $F^1$ are open during the possible period of operation of the relay D between two positions 25° on either side of the synchronizing position $a$. The contacts $E^1$, however, are closed when the needle reaches the position $e^1$ 25° before the synchronizing position and the relay D therefore lifts its contacts $D^2$, these contacts falling at $e^1$ when the contacts $E^1$ fall. Similarly for the slow direction (Figure 5) the relay E has no effect on the synchronizing relay D, but the contacts $F^1$ of the relay F are closed between $f^2$ and $f^1$ respectively 150° and 15° after the synchronizing position $a$, as indicated by section lines, and thus allow the synchronizing relay to lift its contacts $D^2$ at $d^2$ 25° before the synchronizing position, these contacts falling at $f^1$ when the contacts $F^1$ fall. Thus for either direction of rotation the synchronizing relay contacts $D^2$ will lift 25° before the synchronizing position $a$ and will fall 15° after that position, so that the circuit-breaker A can be closed within this period which is indicated by crossed section lines. With this arrangement it will be necessary to provide the synchronizing relay D with a time-lag device, which will prevent the relay from operating its contacts $D^2$ unless the synchroscope needle is rotating sufficiently slowly (i. e. unless the speed of the incoming machine is sufficiently close to that of the running machine).

As has already been mentioned, the arrangement of Figure 1, although applicable to a fully automatic system, is primarily intended as an automatic interlock in a manually-operated system. In this arrangement the synchronizing angle starts 25° before the synchronizing position, but a smaller angle, say 15°, is found to be more suitable for a fully automatic equipment. In practice, however, it is found to be difficult to adjust the synchronizing relay D to give such an angle, and it is therefore found preferable so to arrange the relays that the start of the synchronizing angle is determined by the auxiliary synchronizing relay E instead of by the synchronizing relay. For this purpose the auxiliary relay E may be arranged so that its contacts fall at 15° before the synchronizing position, a further set of contacts (which open when the relay lifts and close when the relay falls) being provided in the closing circuit of the circuit-breaker A, whilst the synchronizing relay D is provided with a further set of contacts which maintain this relay energized after the fall of the auxiliary synchronizing relay contacts. In this case the circuit-breaker can only be closed provided that the synchronizing relay contacts have lifted and the auxiliary synchronizing relay contacts have fallen, and, as in Figure 1, the synchronizing relay remains inoperative for the slow direction of rotation. The necessary adjustment of the auxiliary synchronizing relay for this purpose may be made by altering its setting, but it will usually be preferable to alter the zero position of this relay either instead of or in addition to altering its setting. This may be achieved by connecting a bridging resistance or impedance across the leading and lagging phases of the running machine potential transformer secondary, the auxiliary synchronizing relay then being connected between an intermediate point of this resistance and the leading phase of the incoming machine potential transformer secondary. Thus the zero position of this relay will now lie less than 60° from the synchronizing position by an amount depending on the position of the tapping point on the bridging resistance. If this tapping is at the mid-point of the resistance, the zero position of this relay will be 30° away from the synchronizing position, and the relay may then be given such a setting that its contacts lift at 120° after and fall at 15° before the synchronizing position for the fast direction. Such an arrangement is illustrated in Figure 7, which also shows a convenient form of automatic speed-controlling apparatus for the incoming machine.

In the arrangement of Figure 7 the circuit-breaker A and the potential transformers B C are arranged as before, the same reference letters being employed. A resistance $D^1$ having a mid-point tapping is connected between the leading phases $B^1$ and $C^1$ of the two secondaries and the mid-point is connected to earth through the operating coil of a synchronizing relay $D^3$ and through the normally open contacts $E^4$ of an auxiliary synchronizing relay $E^2$. The operating coil of the auxiliary synchronizing relay $E^2$ is connected between the leading phase $B^1$ of the incoming machine transformer secondary and the mid-point of a resistance $E^3$ bridged across the leading and lagging phases $C^1$ $C^3$ of the running machine transformer secondary. The synchronizing relay is provided with holding contacts $D^4$, so that when once it has been energized by the relay $E^2$ its contacts will remain lifted until their normal fall position independently of the fall of the contacts of the relay $E^2$.

The energizing circuit for the closing coil $A^6$ of the circuit-breaker A, through which the incoming machine is to be connected in circuit with the running machine, is taken from an auxiliary source of D. C. supply G through normally open contacts $D^5$ on the synchronizing relay $D^3$ and normally closed contacts $E^5$ on the auxiliary synchronizing relay $E^2$, and this circuit is also controlled by normally open contacts $H^2$ on a time-lag relay H. The time-lag on the relay H is operative only for the lift of the contacts and permits the contacts to fall instantaneously when the relay is deenergized. The relay H is energized through a resistance $H^1$ from the D. C. source G under the control of contacts $D^6$ on the synchronizing relay $D^3$ and makes its own holding circuit at contacts $H^3$, so that when once its contacts have been completely lifted they remain in their lifted position independently of the movement of the synchronizing relay contacts $D^6$. This time-lag relay H is utilized for the purpose of controlling the speed of the incoming machine and is therefore provided with change-over contacts $H^4$ which control the supply of energizing current to a lower-speed contactor J and a raise-speed contactor $J^1$. These two contactors $J J^1$ control the polarity of the current supplied from the D. C. source G to an auxiliary motor $J^2$, which operates in one or other of the wellknown ways to control the speed of the incoming machine, the arrangement being such that when the raise-speed contactor J¹ is energized the direction of rotation of the motor J² is such as to increase the speed of the machine, whilst when the lower-speed contactor J is energized the machine speed is decreased.

In order to obtain a sufficiently gradual alteration in the speed of the machine, it is preferable to supply the current from the D. C. source G intermittently to the auxiliary motor J², so as to produce an "inching" effect. For this purpose the supply of current to the speed-controlling contactors J J¹ is taken through contacts E⁶ on the auxiliary synchronizing relay E², these contacts E⁶ also controlling a further time-lag relay K, which may be termed an interrupter relay. The interrupter relay K has normally closed contacts K¹, which cooperate with the auxiliary synchronizing relay contacts E⁶ in controlling the interruptions in the supply of current to the contactors J J¹, and is also provided with normally open contacts K², which together with contacts D⁷ on the synchronizing relay D³ act when required to short-circuit the operating coil of the speed-controlling relay H.

The operation of this arrangement will now be described with reference to the synchroscope diagrams of Figures 8 and 9, Figure 8 relating to the slow direction of rotation and Figure 9 to the fast direction.

The auxiliary synchronizing relay E² in this arrangement has its zero position at $e^5$ 30° before or after the synchronizing position $a$ according to whether the machine is slow or fast. The setting of the auxiliary synchronizing relay E² is such that it will lift its contacts 90° after its own zero position and will let them fall 45° before the next zero position, so that for the fast direction (Figure 9) its contacts fall at $e^6$ 15° before the synchronizing position $a$ and lift at $e^7$ 120° after the synchronizing position, whilst for the slow direction (Figure 8) the contacts fall at $e^8$ 75° before the synchronizing position and lift at $e^9$ 60° after the synchronizing position, the periods of lifting of the auxiliary synchronizing relay contacts in each case being indicated by section lines. The synchronizing relay D³ is as before set to lift its contacts 25° before the synchronizing position $a$ and to let them fall 40° after the synchronizing position. Since however for the slow direction (Figure 8) the auxiliary synchronizing relay contacts E⁴ will be open during the period from $d^6$ to $d^7$ 25° on either side of the synchronizing position $a$, it is clear that the synchronizing relay D³ will remain inoperative. For the fast direction (Figure 9) the auxiliary synchronizing relay contacts E⁴ remain closed until $e^6$ and consequently the synchronizing relay D³ will lift its contacts at $d^4$ 25° before the synchronizing position $a$, and will keep them lifted (owing to the provision of the holding contacts D⁴) until their normal fall position $d^5$, the period of lift being indicated by section lines.

If now it is desired to switch in a previously inactive machine, the machine is started up and the necessary adjustments are made to ensure that the voltage of the machine will be correct at synchronous speed. Owing to the fact that the incoming machine is slow, the synchronizing relay D³ will remain inoperative and the speed-controlling relay H will therefore be energized and will after its time-lag lift its contacts, these contacts, owing to the provision of the holding contacts H³, being held in the lifted position. Meanwhile the auxiliary synchronizing relay E² is repeatedly lifting and dropping its contacts, at first so rapidly that the interrupter relay K is unable to lift its contacts. This will allow operating current to be supplied intermittently to the raise-speed contactor J¹, which will in turn intermittently energize the auxiliary motor J² in a direction to increase the machine speed, the periods of interruption (the sectioned portioned between $e^9$ and $e^8$ in Figure 8) remain proportional to the periods of supply of such energizing current between $e^8$ anud $e^9$ in each rotation of the synchroscope needle. This condition will continue until the rate of rotation of the synchroscope needle becomes sufficiently slow to allow the interrupter relay contacts to complete their lift within the period $e^8$ to $e^9$. From then onwards energizing current will be supplied to the auxiliary motor J² for a definite short period from the point $e^8$, namely the time-lag of the interrupter relay K, once for each rotation of the synchroscope needle, the periods of interruption in the supply of energizing current thus increasing and causing a more gradual increase in machine speed as synchronous speed is approached. Ultimately the incoming machine speed will reach and pass the synchronous value, and the synchroscope needle will come to rest and start rotating in the reverse direction, the cycle of operations now being as in Figure 9. At the point $d^4$ in the first rotation of the needle in the fast direction, the synchronizing relay D³ will lift its contacts, shortly after which at $e^6$ the auxiliary synchronizing relay contacts will fall, thus completing the circuit through the contacts H² D⁵ E⁵ to the closing coil A⁶ of the circuit-breaker A and also energizing the interrupter relay K in the usual manner. The circuit-breaker A will now close, and after its time-lag the interrupter relay K will lift its contacts, thus cutting off at K¹ the supply of current to the motor J² and also at K² short-circuiting the speed-controlling relay H, whose contacts will fall and break the circuit to the closing coil $A^6$. The incoming machine is now paralleled with the running machine, and so long as the connection is maintained the synchronizing relay $D^3$ and the interrupter relay K will hold their contacts in the lifted position, the other relays being deenergized.

If on the other hand it is desired to synchronize a machine already rotating at a faster speed than the running machine, the conditions will be as in Figure 9 and the synchronizing relay $D^3$ and the auxiliary synchronizing relay $E^2$ will be repeatedly lifting and dropping their contacts, but at first so rapidly that neither the interrupter relay K nor the speed-controlling relay H will have time to lift its contacts. The lower-speed contactor J will thus be intermittently energized to cause the motor $J^2$ to reduce the machine speed, the periods of interruption in the supply of energizing current (the sectioned portion from $e^7$ to $e^6$) being proportional to the periods of supply from $e^6$ to $e^7$. When the speed has been sufficiently reduced, the interrupter relay K will come into operation to increase the amount of interruption, and the following cycle of events will repeatedly take place:—the synchronizing relay contacts will lift at $d^4$ and cause the speed-controlling relay contacts to fall; the auxiliary synchronizing relay contacts will fall at $e^6$ and cause the interrupter relay contacts to start lifting, the speed-controlling relay contacts being at this stage in their normal position so that energizing current is supplied to the lower-speed contactor J; the interrupter relay K will complete its lift and deenergize the contactor J; the synchronizing relay contacts will fall at $d^5$ and cause the speed-controlling relay contacts to start lifting; the auxiliary synchronizing relay contacts will lift at $e^7$ and deenergize the interrupter relay K; and the cycle will then be repeated. This cycle will continue until the speed is gradually reduced sufficiently to allow the speed-controlling relay H to complete its lift within the period $d^5$ to $d^4$. The speed-controlling relay H will now hold its contacts lifted after point $d^4$ when the synchronizing relay $D^3$ lifts its contacts, and consequently the fall of the auxiliary synchronizing relay contacts at $e^6$ will complete the closing circuit for the circuit-breaker A. As in the case of slow synchronizing, the interrupter relay K will then operate to cause the energizing circuit to the motor $J^2$ and the circuit-breaker closing circuit to be broken.

If it should happen that, whether synchronizing from the fast or the slow side, the circuit-breaker fails to close before its closing circuit is broken, the various relays will continue to operate. First of all the machine speed will fall below synchronous speed and the speed-controlling relay H will lift its contacts and hold them lifted. The speed will then increase again in the manner above described and a further attempt will be made to close the circuit-breaker. If the circuit-breaker again fails to close, the machine speed will continue to oscillate about synchronous speed and repeated attempts will be made to synchronize.

The above arrangement, although normally operating satisfactorily, is however, attended with certain disadvantages. Thus when the incoming machine speed is initially below synchronous speed, the time-lag speed-controlling relay H must first lift its contacts before the auxiliary motor $J^2$ begins to increase the machine speed and while the contacts are first beginning to lift the auxiliary motor is acting still further to reduce the machine speed. The time taken for the machine to synchronize is thus somewhat prolonged. Again, if it should happen that synchronizing operations are commenced with the incoming machine speed slightly above synchronous speed and the voltages of the two machines approximately in phase with one another, the time available for the lifting of the speed-controlling relay contacts might be just sufficient to allow them to complete their lift and thus allow the circuit-breaker to close before its proper time. This arrangement has the further disadvantage, that when, as would often be the case, synchronizing operations are initiated by the insertion of various plugs, great care must be exercised in inserting the plugs in their proper sequence, since otherwise it is possible for the circuit-breaker to close under unsafe conditions.

These disadvantages are obviated in the preferred arrangement illustrated in Figure 10, which will now be described. The synchronizing apparatus of Figure 10 is common to a number of synchronous three-phase generators L (two being shown in the drawing) each capable of supplying power through a circuit-breaker $L^1$ to a common load circuit $L^2$, and acts to control the closing of the appropriate circuit-breaker $L^1$ when an additional machine L is to be brought into service. For convenience of description, it will be assumed that the machine L on the right in the drawing is already running, whilst the left-hand machine L is the incoming machine.

Each machine L is provided with a potential transformer M whose secondary phase-windings $M^1$ $M^2$ $M^3$ are connected in star on one side. The free end of one secondary phase-winding $M^2$ is earthed and those of the other windings $M^1$ $M^3$ are connected to sockets, into which synchronizing and busbar plugs N $N^1$ can be inserted. When an additional machine is to be synchronized, the synchronizing plugs N associated with the incoming machine are inserted in their sockets, as also are the busbar plugs $N^1$ associated with the running machines. Thus the lagging phase $M^3$ of each secondary is connected through a busbar plug $N^1$ to a lagging phase busbar $O^3$, and the leading phase $M^1$ is connected either through a busbar plug $N^1$ to a leading phase busbar $O^1$ or through a synchronizing plug N to a synchronizing busbar O. These three busbars $O$ $O^1$ $O^3$ lead to the synchronizing apparatus, the leading and lagging phase busbars $O^1$ $O^3$ being taken through normally open contacts $P^1$ $P^2$ on a low-volt relay, whose operating coil P is connected on one side to earth and on the other side to the synchronizing busbar O. Thus the low-volt relay P cannot be energized unless a synchronizing plug N has been inserted, and until this relay operates its contacts the leading and lagging phase busbars $O^1$ $O^3$ are disconnected from the synchronizing apparatus. The low-volt relay P also operates contacts $P^3$ $P^4$ controlling the supply of energizing current from an auxiliary D. C. source Q to certain relays forming part of the synchronizing apparatus.

A resistance $R^1$ having a mid-point tapping is connected between the synchronizing busbar O and the leading phase busbar $O^1$, and therefore also between the leading phases $M^1$ of the transformer secondaries associated respectively with the incoming machine and the running machines, the tapping being connected to one side of a synchronizing relay R, the other side of which is connected to earth through normally open contacts $S^2$ on an auxiliary synchronizing relay S. This auxiliary synchronizing relay S is connected on one side to the synchronizing busbar O and on the other side to a mid-point tapping on a resistance $S^1$ connected between the leading and lagging phase busbars $O^1$ $O^3$. Thus if the contacts $S^2$ on the auxiliary synchronizing relay S are closed, the synchronizing relay R will receive its maximum energizing current when the voltages generated by the incoming and running machines are in phase with one another. The synchronizing relay R however cannot lift its contacts unless the auxiliary synchronizing relay S has already been energized, but when it does so it at once makes its own retaining circuit at contacts $R^2$ so that the fall of its contacts is independent of the fall of the auxiliary synchronizing relay contacts.

In addition to the two synchronizing relays R S, the synchronizing apparatus includes also a time-lag relay T, which controls the closing circuit for the circuit-breaker of the incoming machine, an interrupter relay U and two speed-control contactors V $V^1$, all of which are energized through the low-volt relay contacts $P^3$ $P^4$ from the auxiliary D. C. source Q.

The energizing circuit for the time-lag relay T is taken through a resistance $T^1$ and through normally open contacts $R^3$ $S^3$ on the synchronizing relay R and on the auxiliary synchronizing relay S. Thus when both synchronizing relays R S are energized, the contacts of the time-lag relay T begin to lift, this relay completing its own retaining circuit at contacts $T^2$ to render it independent of the auxiliary synchronizing relay S as soon as the lifting movement is completed. This time-lag relay T however still remains dependent on the synchronizing relay R and its contacts fall again instantaneously as soon as the synchronizing relay contacts $R^3$ fall.

The interrupter relay U, which also has a time-lag associated with its lift but not its fall, is energized through normally closed contacts $S^4$ on the auxiliary synchronizing relay S. When the interrupter relay U completes its lift it acts to short-circuit the operating coil of the time-lag relay T at contacts $U^1$ and also to break a circuit at contacts $U^2$ to the two speed-control contactors V $V^1$. This circuit is taken through the normally closed contacts $S^4$ on the auxiliary synchronizing relay S, and the determination as to which speed-control contactor V or $V^1$ is energized is effected by change-over contacts $R^4$ on the synchronizing relay R, the arrangement being such that the raise-speed contactor V is energized when the synchronizing relay R is deenergized and the lower-speed contactor $V^1$ when the synchronizing relay contacts $R^4$ are lifted. The two speed-control contactors V $V^1$ control the polarity of the energizing current supply from the D. C. source Q to busbars $W^1$ $W^2$ to which is connected through plugs $W^3$ which are inserted simultaneously with the synchronizing plugs N an auxiliary motor W, which acts in accordance with its direction of rotation to increase or decrease the speed of the incoming machine, for example by controlling the governor of a steam turbine by which the machine is driven.

The closing coils X of the circuit-breakers $L^1$ are each energized from the D. C. source Q through a synchronizing plug N and a switch-closing busbar $X^1$ under the control of normally open contacts $T^3$ on the time-lag relay T and the normally closed contacts $S^4$ on the auxiliary synchronizing relay S.

Figures 11 and 12 are synchroscope diagrams of this arrangement respectively for the slow and for the fast direction, and the operation of the arrangement will be described with reference thereto, although it will be appreciated that in actual practice the provision of a rotary synchroscope would be unnecessary in a fully automatic scheme.

When it is desired to bring a machine into circuit with running machines, the appropriate synchronizing and busbar plugs N N¹ are inserted in their sockets (the synchronizing plug N on the incoming machine on the left-hand and the busbar plug N¹ on the running machine on the right being closed), and the low-volt relay P is consequently caused to operate its contacts and supply the necessary energizing currents to the synchronizing apparatus. The connections to the auxiliary synchronizing relay S are such that the E. M. F. across its coil becomes zero at $s$ (Figures 11 and 12), 30° after the synchronizing position $a$ in the case of the fast direction or 30° before that position in the case of the slow direction. This relay S is set to lift its contacts say 120° after this zero position is passed, the contacts falling 35° before the zero position is again reached. Thus for the fast direction of rotation (Figure 12) the auxiliary synchronizing relay contacts will fall at $s^1$ 5° before the synchronizing position $a$ and will lift at $s^2$ 150° after the synchronizing position, and for the slow direction (Figure 11) the contacts will fall at $s^3$ 65° before and lift at $s^4$ 90° after the synchronizing position.

The synchronizing relay R is set to lift its contacts 50° before the synchronizing position is reached, the contacts falling 150° after the synchronizing position is passed. Thus for the fast direction, the auxiliary synchronizing relay contacts will lift at $s^2$ 150° after the synchronizing position $a$, the synchronizing relay contacts will lift at $r^1$ 50° before the next synchronizing position $a$, the auxiliary synchronizing relay contacts will fall at $s^1$ 5° before the synchronizing position, and the synchronizing relay contacts will fall at $s^2$ 150° after the synchronizing position simultaneously with the lifting of the auxiliary synchronizing relay contacts. For the slow direction on the other hand the auxiliary synchronizing relay contacts fall at $s^3$ 65° before the synchronizing position $a$ and will not lift again until $s^4$ 90° after that position, so that it is impossible for the synchronizing relay R to operate its contacts at all since its energizing circuit is taken through contacts $s^2$ on the auxiliary synchronizing relay which are open during the period between $r^2$ and $r^3$ 50° on either side of the synchronizing position when the synchronizing relay could operate. Thus for the slow direction the synchronizing relay R remains inoperative with its contacts down.

If now when synchronizing operations are commenced the speed of the incoming machine is below synchronous speed, the auxiliary synchronizing relay contacts will repeatedly rise and fall, but the synchronizing relay R and therefore also the time-lag relay T will remain inoperative. Each time the auxiliary synchronizing relay contacts fall a circuit is completed to the interrupter relay U and also to the raise-speed contactor V.

At first however the synchroscope needle will be rotating so fast that the interrupter relay contacts have not sufficient time to complete their lift. During this period current is being supplied to the auxiliary motor W in a direction to raise the machine speed, this current being intermittently interrupted by the rise and fall of the auxiliary synchronizing relay contacts $S^4$. At a predetermined point in the approach to synchronous speed, the interrupter relay contacts $U^2$ complete their lift before the auxiliary synchronizing relay contacts $S^4$ lift and from this point onwards bring about an increased interruption in the supply of energizing current to the auxiliary motor W. This condition continues until synchronous speed is reached, when the synchroscope needle comes to rest and starts rotating in the reverse direction. During the first reverse rotation the synchronizing relay contacts will lift and consequently also the contacts of the time-lag relay T will start lifting. Since the speed of the incoming machine is at this stage practically equal to synchronous speed, the needle will rotate very slowly and the time-lag relay contacts will have time to complete their lift and thus complete at contacts $T^3$ the closing circuit $X^1$ for the circuit-breaker $L^1$ associated with the incoming machine. This closing circuit is taken through the normally closed contacts $S^4$ on the auxiliary synchronizing relay S, but it is unnecessary for the synchronizing relay R also to control this circuit since the time-lag relay T can never be energized unless the synchronizing relay is also energized. Sufficient time for the completion of the closing operation is allowed, owing to the fact that the time-lag relay T makes its own retaining circuit at contacts $T^2$ and therefore remains energized until short-circuited by the interrupter relay contacts $U^1$. Thus the circuit-breaker closing circuit and also the supply circuit to the auxiliary motor W are broken, when the incoming machine has been correctly connected into circuit.

In the case when synchronizing operations are initiated with the incoming machine speed greater than synchronous speed, the synchronizing and auxiliary synchronizing relay contacts will repeatedly rise and fall, but at first so rapidly that the time-lag relay T and the interrupter relay U have not at first sufficient time to operate their contacts. Energizing current can be supplied to the speed-control contactors V V¹ only when the auxiliary synchronizing relay contacts S⁴ are down and since at such times the synchronizing relay contacts R⁴ will be lifted, current is supplied intermittently to the lower-speed contactor V¹, so that the auxiliary motor W acts to reduce the machine speed. After a time the rotation of the synchroscope needle becomes slow enough to allow the interrupter relay U to operate its contacts U² thus increasing the amount of interruption in the supply of energizing current to the auxiliary motor W. When the machine speed has been reduced practically to synchronous speed the time-lag relay contacts T³ will close and will complete the circuit-breaker closing circuit as before, the interrupter relay U then acting at the appropriate moment to break the circuit-breaker closing circuit and the supply circuit to the auxiliary motor W.

Failure of the circuit-breaker L¹ to close within the time allowed will cause the various relays to continue to operate, the machine speed oscillating about synchronizing speed so that repeated attempts will be made to synchronize.

It will be appreciated that in both the arrangements of Figures 7 and 10 the synchronizing relay (which is rendered inoperative for one direction of relative rotation of the incoming and running machines by the auxiliary synchronizing relay) performs either directly or indirectly the double function of determining which of the speed-control contactors shall be operative and of introducing a time-delay action to prevent closing of the circuit-breaker before synchronous speed has been sufficiently nearly reached. In the arrangement of Figure 7 both functions are performed by a separate time-lag relay, whilst in the arrangement of Figure 10 the speed-controlling function is performed by the synchronizing relay itself and a separate relay is employed for the time-delay function. In a further alternative the synchronizing relay is given a time-lag and itself controls the circuit-breaker closing circuit, whilst the speed-controlling function is performed by a separate instantaneously acting relay.

This further alternative arrangement is illustrated in Figure 13 and is generally similar to the arrangement of Figure 7, the same reference letters being employed where applicable. Thus the arrangement of the auxiliary synchronizing relay E² and its contacts is identical with that of Figure 7 as also is the interrupting relay K except that the contacts K² are no longer necessary. The energizing circuit of the synchronizing relay D³ is also as in Figure 7. The synchronizing relay D³ is however in this arrangement provided with a time-lag operative for its lift but not its fall and the relay now has four sets of contacts D⁹ D¹⁰ D¹¹ D¹², of which two D¹⁰ and D¹¹ operate at the end of the time-lag, whilst the other two D⁹ and D¹² close immediately the relay begins to lift. The early-acting contacts D⁹ replace the holding contacts D⁴ of Figure 7, and the late-acting contacts D¹⁰ replace the contacts D⁵ and H² of Figure 7 in controlling the circuit-breaker closing circuit, whilst the late-acting contacts D¹¹ replace the contacts D⁷ and K² of Figure 7 in short-circuiting the operating coil of the speed-controlling relay H which now is unprovided with a time-lag and is instantaneous in operation. The energizing circuit for the relay H is controlled by the early-acting contacts D¹² on the synchronizing relay D³, and as in Figure 7 this relay H makes its own holding circuit at H³. The only other contacts of the relay H are the speed-controlling change-over contacts H⁵, which are now arranged oppositely to the corresponding contacts H⁴ of Figure 7, so that when the contacts H⁵ are lifted energizing current can be supplied to the lower-speed contactor J whilst when the contacts H⁵ are in their normal positions current can be supplied to the raise-speed contactor J¹.

Thus for slow synchronizing, the synchronizing relay D³ and therefore also the speed-controlling relay H remain inoperative, and current is supplied intermittently to the raise-speed contactor J¹ under the control of the contacts E⁶ and K¹ until the synchronous speed is passed. During the first rotation of the synchroscope needle in the reverse direction the synchronizing relay contacts start lifting at the point $d^4$ (Figure 9) and owing to the holding contacts D⁹ complete their lift independently of the fall of the auxiliary synchronizing relay contacts E⁴ at $e^6$. Immediately the relay D³ starts lifting however the contacts D¹² close and energize the speed-controlling relay H which makes its own holding circuit at H³. When the synchronizing relay D³ completes its lift the contacts D¹⁰ close to complete the circuit-breaker closing circuit and the contacts D¹¹ short-circuit the speed-controlling relay H.

For synchronizing from the fast side, the synchronizing relay contacts will repeatedly start lifting and will therefore on the first occasion at once energize the speed-controlling relay H, which will thereafter hold its contacts H⁵ in a position to energize intermittently the lower-speed contactor J. When synchronous speed is approached, the time interval between $d^4$ and $d^5$ (Figure 9) will become long enough to allow the synchronizing relay D³ to complete its lift, thus completing at contacts D¹⁰ the closing circuit for the circuit-breaker and at contacts D¹¹ short-circuiting the speed-controlling relay H.

It will be appreciated that the arrangements more particularly described have been given by way of example only and that modifications may be made within the scope of the invention. Thus an A. C. supply may be employed for the auxiliary motor instead of a D. C. supply. Again the control of the speed-controlling relay in accordance with the direction of relative rotation of the incoming and running machines may be effected in other ways, and in this case the automatic speed-control arrangement may be employed with phase-control arrangements other than those described.

What we claim as our invention and desire to secure by Letters Patent is:—

1. In electric synchronizing apparatus for polyphase synchronous machines, the combination with an incoming machine and a running machine, of a circuit-breaker controlling the connection of the incoming machine into circuit with the running machine, and means for controlling the closing of the circuit-breaker comprising two potential transformers whose primaries are respectively connected to the two machines, an earth connection to corresponding points of the secondaries of the two potential transformers, a resistance connected between other corresponding points of the secondaries of the two potential transformers, a synchronizing relay connected between earth and the mid-point of such resistance and acting when operated to allow the circuit breaker to close, and means whereby the operation of the circuit-breaker is rendered dependent upon the direction of relative rotation of the two machines.

2. In electric synchronizing apparatus for polyphase synchronous machines, the combination with an incoming machine and a running machine, of a circuit-breaker controlling the connection of the incoming machine into circuit with the running machine, and means for controlling the closing of the circuit-breaker comprising a synchronizing relay so connected into circuit as to receive its maximum energizing current when the voltages of the two machines are in phase with one another, means for preventing the circuit-breaker from closing except when the synchronizing relay has operated its contacts, an auxiliary synchronizing relay, means for so energizing the auxiliary synchronizing relay in accordance with the voltages of the two machines that it will receive its maximum and minimum energizing currents when there is a relatively large phase difference between such voltages, and means whereby the auxiliary synchronizing relay so controls the energization of the synchronizing relay as to render that relay inoperative for one direction of relative rotation of the two machines.

3. In electric synchronizing apparatus for polyphase synchronous machines, the combination with an incoming machine and a running machine, of a circuit-breaker controlling the connection of the incoming machine into circuit with the running machine, and means for controlling the closing of the circuit-breaker comprising two potential transformers whose primaries are respectively connected to the two machine, an auxiliary synchronizing relay energized differentially from non-corresponding parts of the secondaries of the two potential transformers, means for preventing the circuit-breaker from closing except when the phase difference between the voltages of the two machines is sufficiently small, and means whereby the auxiliary synchronizing relay acts to render the operation of the circuit-breaker dependent on the direction of relative rotation of the two machines.

4. In electric synchronizing apparatus for polyphase synchronous machines, the combination with an incoming machine and a running machine, of a circuit-breaker controlling the connection of the incoming machine into circuit with the running machine, and means for controlling the closing of the circuit-breaker comprising two potential transformers whose primaries are respectively connected to the two machines, an earth connection to corresponding points of the secondaries of the two potential transformers, a resistance bridged across two of the phases of the secondary of one potential transformer, an auxiliary synchronizing relay connected between an intermediate point of such resistance and one of the phases of the secondary of the other potential transformer, means for preventing the circuit-breaker from closing except when the phase difference between the voltages of the two machines is sufficiently small, and means whereby the auxiliary synchronizing relay acts to prevent closing of the circuit-breaker for one direction of relative rotation of the two machines.

5. In electric synchronizing apparatus for polyphase synchronous machines, the combination with an incoming machine and a running machine, of a circuit-breaker controlling the connection of the incoming machine into circuit with the running machine, two potential transformers whose primaries are respectively connected to the two machines, an earth connection to corresponding points of the secondaries of the two potential transformers, a resistance connected between other corresponding points of the secondaries of the two potential transformers, a synchronizing relay connected between earth and the mid-point of such resistance, a second resistance bridged across two of the phases of the secondary of one potential transformer, an auxiliary synchronizing relay connected between an intermediate point of the second resistance and one of the phases of the secondary of the other potential transformer, and means whereby the two relays act to control the closing of the circuit-breaker.

6. In electric synchronizing apparatus for controlling the connection of a polyphase incoming machine into circuit with a running machine, the combination of a circuit-breaker between the two machines, two potential transformers whose primaries are respectively connected to the two machines, a synchronizing relay which lifts its contacts when its energizing current is above a predetermined value, means for so energizing the synchronizing relay from the two potential transformers that it will receive its maximum operating current when the voltages of the two machines are in phase with one another, means whereby the circuit-breaker cannot be closed unless the synchronizing relay has lifted its contacts, an auxiliary synchronizing relay controlling the operating circuit to the synchronizing relay, and means for so energizing the auxiliary synchronizing relay from the two potential transformers that it will receive its maximum and minimum energizing currents when there is a relatively large phase difference between the voltages of the two machines whereby the synchronizing relay is rendered inoperative when the speed of the incoming machine is less than that of the running machine.

7. In electric synchronizing apparatus, the combination with the features set forth in claim 2, of a time-lag relay which is energized when the synchronizing relay operates its contacts and acts to prevent closing of the circuit-breaker unless the synchronizing relay contacts have been held operated for a predetermined time.

8. In electric synchronizing apparatus the combination with the features set forth in claim 6, of a time-lag relay which is operative when the speed of the incoming machine is greater than that of the running machine to prevent closing of the circuit-breaker unless the difference between the speeds of the two machines is sufficiently small.

9. In electric synchronizing apparatus for controlling the speed of an incoming dynamo-electric machine relative to that of a running machine, the combination of an auxiliary motor which acts in accordance with its direction of rotation to increase or decrease the speed of the incoming machine, a speed-controlling relay the movement of whose contacts from one operative position to the other causes the direction of rotation of the auxiliary motor to be reversed, and means for controlling the operation of the speed-controlling relay in accordance with the phase relationship between the voltages of the two machines whereby for one direction of relative rotation of the two machines its contacts remain continuously in one operative position whilst for the other direction of relative rotation the contacts intermittently occupy the other operative position.

10. In electric synchronizing apparatus for controlling the speed of an incoming dynamo-electric machine relative to that of a running machine, the combination of an auxiliary motor which acts in accordance with its direction of rotation to increase or decrease the speed of the incoming machine, a speed-controlling relay the movement of whose contacts from one operative position to the other causes the direction of rotation of the auxiliary motor to be reversed, a relay energized in accordance with the phase relationship between the voltages of the incoming and running machines and acting to cause the supply of energizing current to the auxiliary motor to be intermittently interrupted, and means for controlling the speed-controlling relay in accordance with the direction of relative rotation of the two machines.

11. In electric synchronizing apparatus for controlling the speed of an incoming dynamo-electric machine relative to that of a running machine, the combination of an auxiliary motor which acts in accordance with its direction of rotation to increase or decrease the speed of the incoming machine, a speed controlling relay, the movement of whose contacts from one operative position to the other causes the direction of rotation of the auxiliary motor to be reversed, an auxiliary relay energized in accordance with the phase relationship between the voltages of the two machines, and means whereby such auxiliary relay performs the double function of intermittently interrupting the supply of energizing current to the auxiliary motor and of controlling the operation of the speed controlling relay in accordance with the direction of relative rotation of the two machines.

12. In electric synchronizing apparatus for controlling the speed of an incoming dynamo-electric machine relative to that of a running machine, the combination of an auxiliary motor which acts in accordance with its direction of rotation to increase or decrease the speed of the incoming machine, a speed controlling relay, the movement of whose contacts from one operative position to the other causes the direction of rotation of the auxiliary motor to be reversed, means for so energizing the speed controlling relay in accordance with the voltages of the two machines that it will receive its maximum energizing current when the two voltages are in phase with one another, an auxiliary relay so energized in accordance with the voltages of the two machines that it will receive its maximum and minimum energizing currents when there is a relatively large phase difference between such voltages, means whereby the auxiliary relay allows energizing current to pass to the speed controlling relay only for one direction of relative rotation of the two machines, and means whereby the auxiliary relay causes the supply of energizing current to the auxiliary motor to be intermittently interrupted.

13. In electric synchronizing apparatus for controlling the speed of an incoming dynamo-electric machine relative to that of a running machine, the combination of an auxiliary motor which acts in accordance with its direction of rotation to increase or decrease the speed of the incoming machine, a speed-controlling relay the movement of whose contacts from one operative position to the other causes the direction of rotation of the auxiliary motor to be reversed, means for controlling the speed-controlling relay in accordance with the direction of relative rotation of the incoming and running machines, an auxiliary relay energized in accordance with the phase relationship between the voltages of the two machines and acting to cause the supply of energizing current to the auxiliary motor to be intermittently interrupted, and a time-lag relay controlled by the auxiliary relay and acting at a predetermined point in the approach to synchronous speed to increase the amount of interruption in the supply of energizing current to the auxiliary motor.

14. In electric synchronizing apparatus for polyphase synchronous machines, the combination with an incoming machine and a running machine, of a circuit-breaker controlling the connection of the incoming machine into circuit with the running machine, an auxiliary motor which acts in accordance with its direction of rotation to increase or decrease the speed of the incoming machine, two electromagnetic relays operated in accordance with the phase relationship between the voltages of the two machines, a time-lag relay whose operation is dependent on that of such relays, means whereby the three relays cooperate to control the direction of rotation of the auxiliary motor in accordance with the direction of relative rotation of the two machines and to allow closing of the circuit-breaker only during one direction of relative rotation of the two machines when the phase-difference between the voltages of the two machines has remained below a predetermined value for a predetermined time.

15. In electric synchronizing apparatus, for polyphase synchronous machines, the combination with an incoming machine and a running machine, of a circuit-breaker controlling the connection of the incoming machine into circuit with the running machine, an auxiliary motor which acts in accordance with its direction of rotation to increase or decrease the speed of the incoming machine, means for controlling the direction of rotation of the auxiliary motor in accordance with the direction of relative rotation of the two machines, a synchronizing relay acting to prevent closing of the circuit-breaker except when the phase difference between the voltages of the two machines is sufficiently small, and an auxiliary synchronizing relay which acts both to render the synchronizing relay inoperative for one direction of relative rotation of the two machines and to cause the supply of energizing current to the auxiliary motor to be intermittently interrupted.

16. In electric synchronizing apparatus for polyphase synchronous machines, the combination with an incoming machine and a running machine, of a circuit-breaker controlling the connection of the incoming machine into circuit with the running machine an auxiliary motor which acts in accordance with its direction of rotation to increase or decrease the speed of the incoming machine, a synchronizing relay so connected into circuit as to receive its maximum operating current when the voltages of the two machines are in phase with one another, means whereby the circuit-breaker is prevented from closing except when the synchronizing relay has operated its contacts, means for rendering the synchronizing relay inoperative for one direction of relative rotation of the two machines, and means whereby the movement of the synchronizing relay contacts from one operative position to the other causes the direction of rotation of the auxiliary motor to be reversed.

17. In electric synchronizing apparatus for polyphase synchronous machines, the combination with an incoming machine and a running machine, of a circuit-breaker controlling the connection of the incoming machine into circuit with the running machine, an auxiliary motor which acts in accordance with its direction of rotation to increase or decrease the speed of the incoming machine, a synchronizing relay acting to prevent closing of the circuit-breaker except when the phase difference between the voltages of the two machines is sufficiently small, means whereby the movement of the synchronizing relay contacts from one operative position to the other causes the direction of rotation of the auxiliary motor to be reversed, an auxiliary synchronizing relay acting to render the synchronizing relay inoperative for one direction of relative rotation of the two machines, means whereby the auxiliary synchronizing relay causes the supply of energizing current to the auxiliary motor to be intermittently interrupted, a time-lag relay controlled by the synchronizing relay and acting to prevent closing of the circuit-breaker except when the difference between the speeds of the two machines is sufficiently small, and a second time-lag controlled by the auxiliary synchronizing relay and acting at a predetermined point in the approach to synchronous speed to increase the amount of interruption in the supply of energizing current to the auxiliary motor.

In testimony whereof we have signed our names to this specification.

THOMAS REGINALD WARREN.
NORMAN COOKE.